Figure 1:
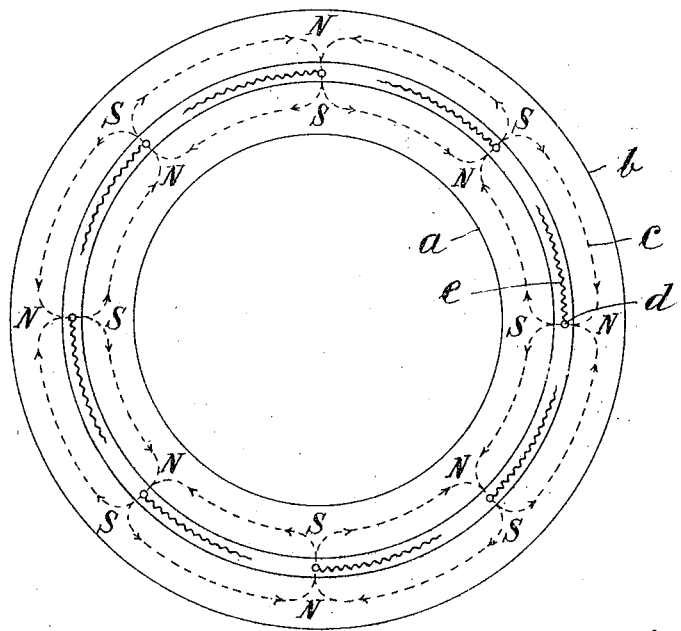

J. J. THORESEN & F. THARALDSEN.
METHOD OF AND APPARATUS FOR DEVIATING ELECTRIC ARCS.
APPLICATION FILED FEB. 16, 1905.

996,951.

Patented July 4, 1911.
5 SHEETS—SHEET 1.

Witnesses:
W. Rabsilbey
L. H. Staaden

Inventors:
Johan Jetmund Thoresen
and Filip Tharaldsen
by Alf. W. Miller
Atty

J. J. THORESEN & F. THARALDSEN.
METHOD OF AND APPARATUS FOR DEVIATING ELECTRIC ARCS.
APPLICATION FILED FEB. 16, 1905.

996,951.

Patented July 4, 1911.
5 SHEETS—SHEET 2.

UNITED STATES PATENT OFFICE.

JOHAN JETMUND THORESEN, OF CHRISTIANIA, AND FILIP THARALDSEN, OF MERAKER, NORWAY.

METHOD OF AND APPARATUS FOR DEVIATING ELECTRIC ARCS.

996,951.

Specification of Letters Patent. Patented July 4, 1911.

Application filed February 16, 1905. Serial No. 245,837.

*To all whom it may concern:*

Be it known that we, JOHAN JETMUND THORESEN and FILIP THARALDSEN, subjects of the King of Norway, and residing at Christiania and Meraker, respectively, in the Kingdom of Norway, have invented certain new and useful Improvements in Methods of and Apparatus for Deviating Electric Arcs, of which the following is a specification.

Our invention relates to the novel method or process of deviation of electric arcs or electric discharges, which method or process consists in producing such deviation by means of a rotary magnetic field in the manner that in a magnetic field rotating between two iron cores and perpendicular to said field are placed the two electrodes producing the arcs, the object being to be able to give the deviated arc the form, velocity and duration, which produces the highest efficiency, and further the invention relates to the construction of apparatus in which arcs deviated in the above described manner are employed to decompose and combine gases, for instance air in the production of combinations of nitrogen and oxygen.

A rotating field can be obtained in several ways. One method is the following: It is known that a polyphase alternating current will, when the energizing coils are arranged in a particular way, produce a rotary field. Such rotary field has hitherto been employed in the socalled multiphase current motors. By making such a rotary sine-formed field rotate between two cylindrical iron cores, of which the one (the primary and stationary part) has energizing coils and the other (the secondary and rotating part) being provided with selfinduction coils, a current will be set up in the latter coils. The electro-dynamic action between the electrically rotatory primary field and the current induced in the induction coils produces a torque, which causes the secondary core to rotate along with the said field. By preventing the secondary core as well as the coils from rotating and by making a rupture in the said coils and placing the ends of the rupture (electrodes) in the field perpendicular to the direction of the latter, an electric arc or series of electric discharges will be produced in the space between the cores, and the current will pass through said arcs perpendicularly to the field. The electro-dynamic force produced by the combined action of the current in the arcs and rotary field will cause the arcs to be deviated to one side and in the direction, in which the field rotates. As the direction of the lines of force of the rotary field is determined by the shape of the field cores and the path of the arc being always perpendicular to the field, it is evident that by giving the field cores a cylindrical, or other shape and moving the field accordingly the arcs will assume a cylindrical or other shape. By making the cores cylindrical and causing the field to rotate, the electrodes being placed at suitable intervals, we obtain a continuous row of arcs, each forming a part of a cylindrical surface, and all the said arcs together constitute a complete cylindrical surface. The arc may be supplied with current from a separate single-, two- or three-phase transformer or from a source of direct current instead of supplying the same with current from the secondary coils. It may be necessary to have in series with the arcs a certain amount of selfinduction in order to impede the flow of current. We can also connect the electrodes in series with the coils, that produce the magnetic field. If the coils which produce the field are fed with direct current and the said coils being connected in series with the electrodes producing the arcs, we have direct current both in the field as well as in the arc.

In order to explain the above described phenomena we refer to the appended drawings, in which:—

Figure 4:
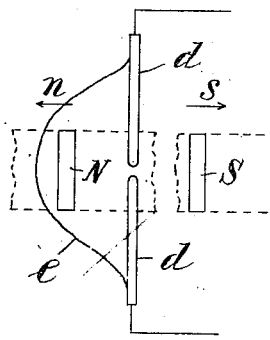
Figure 3:
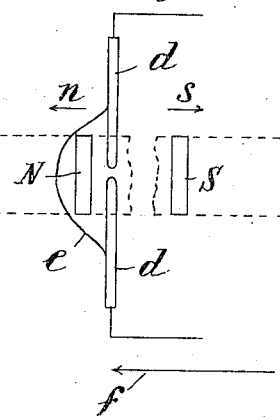
Figure 2:
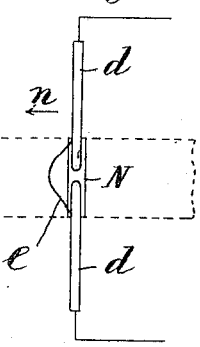
Figure 5:
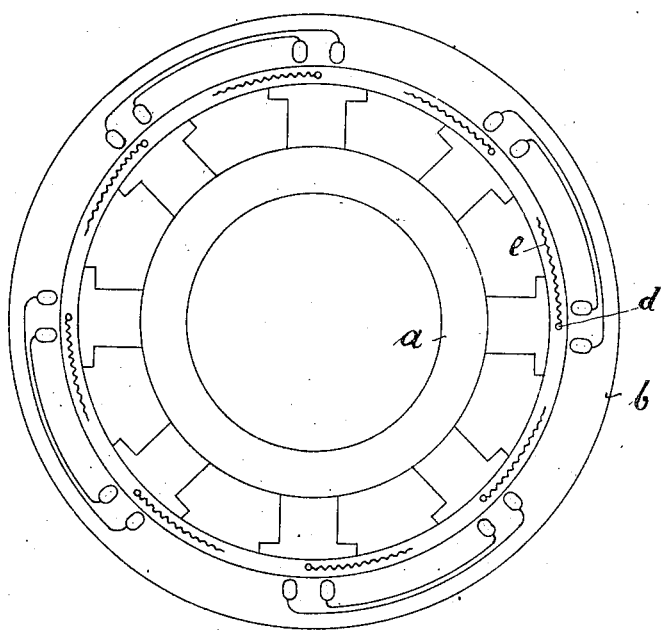
Figure 6:
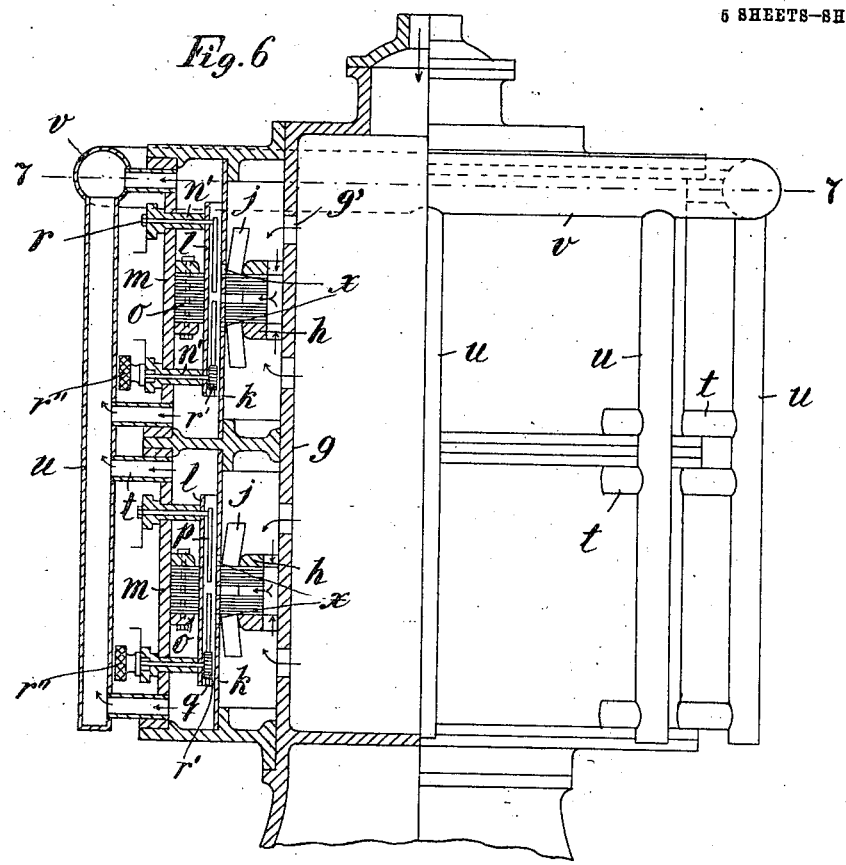
Figure 7:
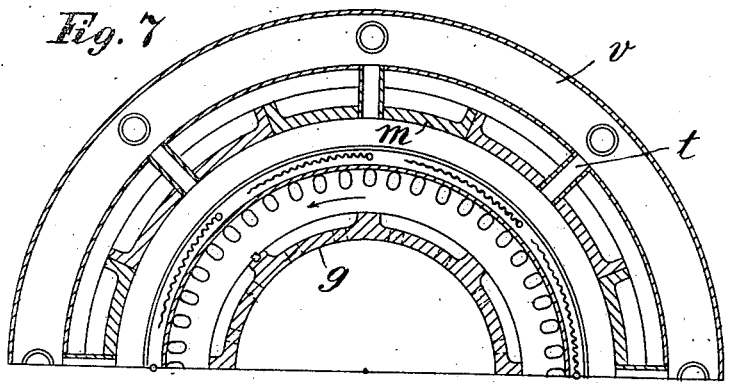
Figure 8:
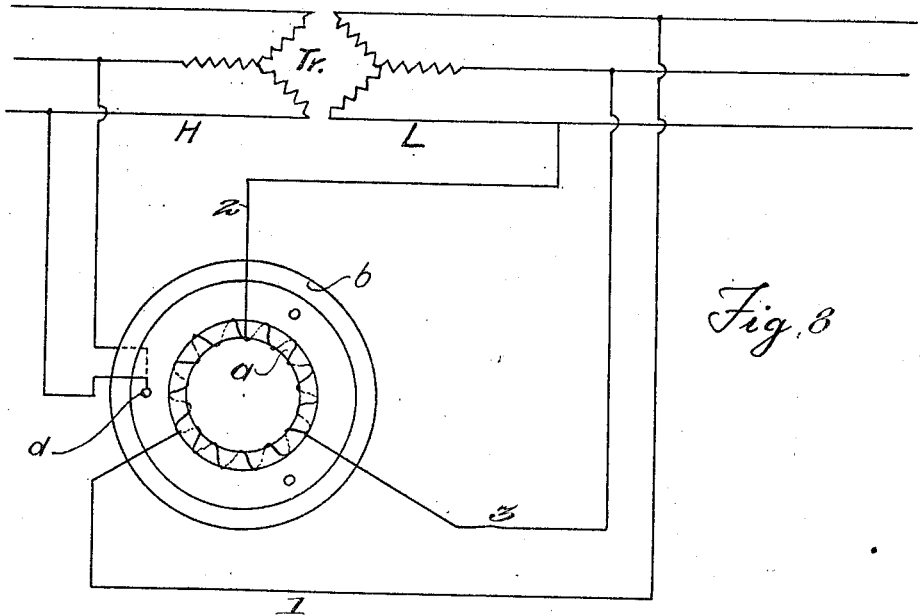
Figure 9:
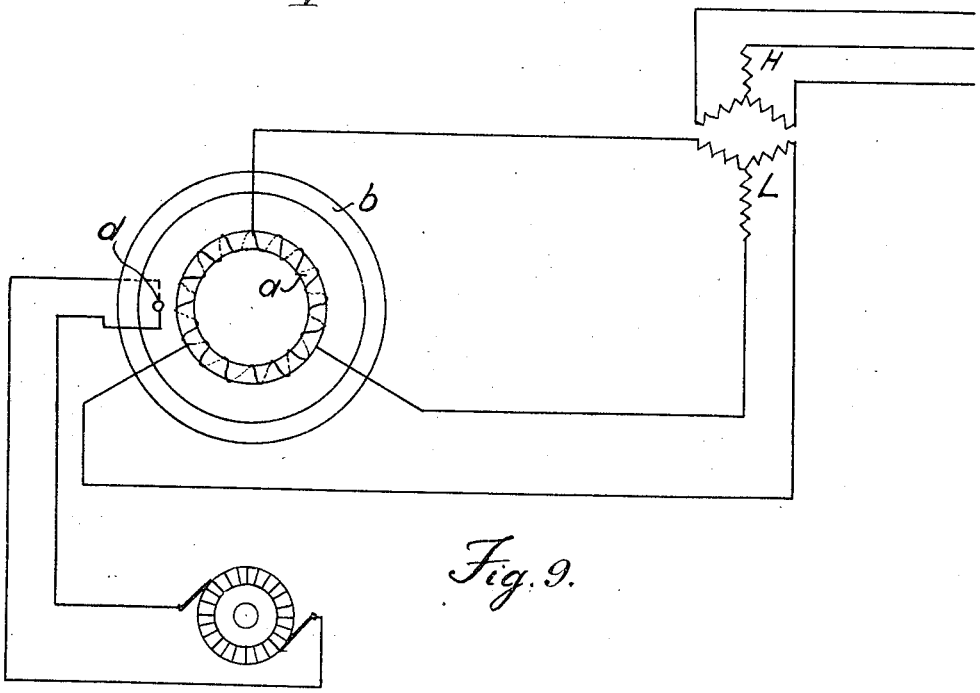
Figure 10:
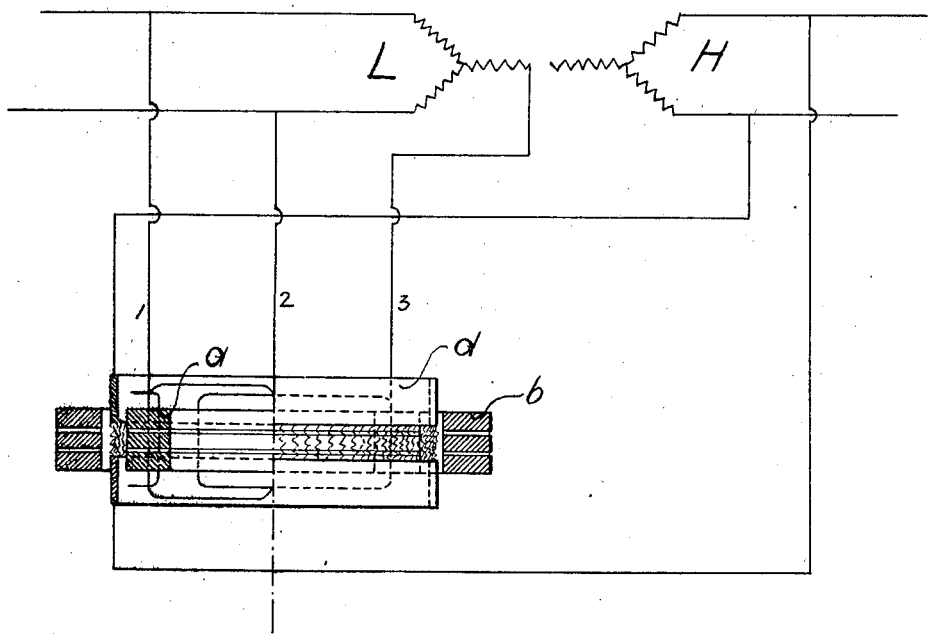
Figure 11:
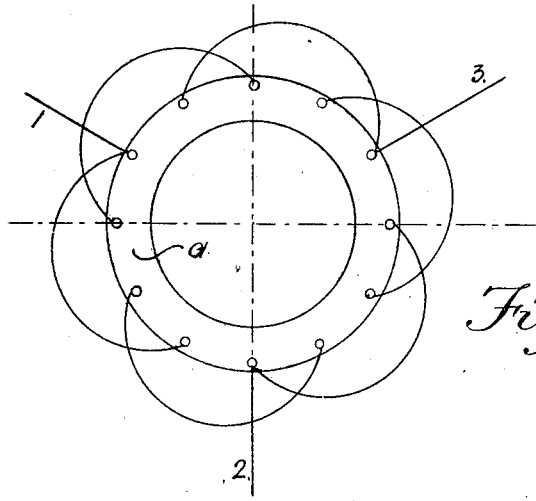

Figure 1 shows in plan view, an arrangement of cylindrical cores with eight poles. Figs. 2, 3 and 4 illustrate the action of the magnet poles on the arc during three successive positions of the maximum of the magnet poles. Fig. 5 is a plan view similar to that shown in Fig. 1, in which the inner core is made rotatable. Figs. 6 and 7 are respectively a vertical section and plan view of an apparatus to be used for the purpose of producing chemical actions on gases by means of deviated arcs. Fig. 8 represents a diagram showing connections when supplying the electrodes from a single-, two- or three-phase transformer. Fig. 9 represents a diagram showing connections for supplying the electrodes from a source of direct current. Fig. 10 represents the arrangement of a pair of annular electrodes placed between cylindrical iron cores, and Fig. 11 shows a diagram of the energizing coils on the core $a$ in Fig. 10.

Referring particularly to Fig. 1, $a$ is the one core, for instance the primary, and $b$ is the other core, for instance the secondary. The said cores are placed with a suitable space between them. Between said cores rotates a magnetic field, which in the present case has eight poles, and which is produced in the manner described above; the broken lines $c$ indicate the magnetic circuits. In this case the electrodes $d$ are placed in pairs, and the number of pairs correspond to the number of the poles of the magnetic field; $e$ of the deviated arcs. The connection of the source of current with the electrodes and the polarity of the magnetic field are arranged in such a manner that the arcs are all deviated in the same direction. By placing the electrodes with a suitable distance between each other in each pair, the electrodes might be supplied with single-, two- or three-phase alternating current. If the arcs are fed with direct current, it is only necessary to place the arcs at such distance apart as will give the greatest surface.

In Figs. 2, 3 and 4 is illustrated the action of the magnet poles on the arc when the latter is fed with alternating current, showing three positions of the magnetic poles during the deviation of the arc. N and S are the magnetic poles, the arrows $n$ and $s$ indicate the direction of the force of said poles and the arrow $f$ indicates the direction of the movement of the fields; $d$, $d$ are the electrodes, $e$ is the arc.

In Fig. 5 is shown an arrangement, in which "rotary" field is in direct connection with the source of power, so as to avoid the use of a separate generator. The inner core $a$ consists of a pole wheel (rotor), which is excited in the well known manner from a source of direct current. Between the rotor $a$ and the stator $b$ sufficient space is left for the insertion of the electrodes.

All the above described arrangements have the common feature that, in order to obtain large units, which is necessary to gain economy as well in cost as in space and allow of easy inspection, the magnets or field are arranged like the magnets or field on a motor or generator having several poles. When using such deviated arcs for the purpose of chemical decomposition and combination of gases, for instance air, the above described method offers the great advantage, that the apparatus may be arranged in such a manner that the gases are introduced in the middle of the said apparatus and after having passed the arcs the gases escape through outlet passages in the outer wall and may be collected in any convenient manner.

In Figs. 6 and 7 of the drawings we show an apparatus, which is very suitable for the chemical decomposition and combination of gases by means of arcs deviated according to our above described method. The inner core consists of a cast iron cylinder $g$, on which are mounted in two levels, primary iron cores $h$ provided with coils $j$. Around the cores $h$ are placed cylindrical partition walls $k$ of fireproof insulating material. Said walls are provided with perforations $x$ located directly opposite the arcs for guiding the gases against the arcs. At a suitable distance from the said walls $k$ are placed partitions $l$, which are supported by insulators $n'$, secured to the outer wall $m$ of the apparatus. $o$ are secondary cores mounted on the inside of the wall $m$. Between the partitions $k$ and $l$ are placed electrode pairs $p$, $q$, which are supported by rods $r$ inserted in the said insulators $n'$; in order to be able to adjust one of the said electrodes, for instance the electrode $q$ the latter is slidably attached to the insulator $n'$ and provided with a rack; and the rod $r$ is provided with a cogwheel, $r'$, which engages said rack; the rod $r$ may be turned by means of a handwheel $r''$ fixed on its outer end, as shown.

By arranging the electrodes so that they simultaneously may be turned and adjusted relative to the field in the same manner as the brush holders on a direct current commutator we are able to regulate the position of the electrodes.

The working of the apparatus is as follows:—The gases (air) enter from above into the middle of the apparatus, pass through apertures $g'$ in the wall $g$, pass around and inside the primary cores $h$ and cooling the latter, while the air is being heated; thence through the perforations $x$ in the wall $k$ and after being subjected to the action of the arcs, the gases pass around the cores $o$ and escape through passages in the outer wall $m$ and thence through passages $t$ and $u$ into the annular receiver $v$, (see the direction of the arrows).

In the above described construction of the apparatus the rotary field is produced by means of polyphase alternating current.

If the rotary field is to be produced by means of direct current the inner core must be made rotatable and have the form as shown in Fig. 5.

In the diagrammatical Fig. 8 are represented the connections when supplying the electrodes from a single-, two-, or three-phase transformer, $a$ being the primary core, $b$ the secondary core, and $d$ the electrodes; Tr is a three-phase transformer. H is high potential side; L is low potential side, and 1, 2 and 3 are the three phases brought down to the energizing coils producing the rotary field;

in diagrammatical Fig. 9 are represented the connections for supplying the electrodes from a source of direct current.

Referring to Figs. 10 and 11, we have here shown the arrangement of a pair of annular electrodes $d$, $d$, placed between cylindrical iron cores $a$ and $b$, the former $a$ containing the energizing coils for producing the rotary field and being wound like a polyphase motor, the arcs moving in the space between the electrodes.

We claim:—

1. The method or process of deviating electric arcs or electric discharges, which consists in establishing an electric arc, creating a rotary magnetic field adapted to deviate the said arc, and passing a current of gas past and in contact with the said arc, substantially as and for the purpose set forth.

2. The method or process of deviating electric arcs or electric discharges which consists in establishing an alternating current electric arc, deviating the said arc by means of a rotary magnetic field supplied with alternating current, and passing a current of gas past and in contact with the said arc, substantially as and for the purpose set forth.

3. The method or process of deviating electric arcs, which consists in establishing an electric arc, creating a rotary magnetic field adapted to deviate the said arc, and passing a current of gas through the said arc perpendicularly to the said rotary field.

4. In the method or process of deviating an electric arc, the step which consists in creating a rotary magnetic field, supplying the electric arc to be deviated thereby with current induced by the said rotary field, and passing a current of gas past and in contact with the said arc.

5. The method or process of deviating an electric arc, which consists in establishing a multi-phase current electric arc, creating a rotary magnetic field for the purpose of deviating the said arc and passing a current of gas through the said arc.

6. An apparatus for producing chemical reactions in a mass of gases, consisting of means for forming an electric arc and causing the latter to play in the mass of gases, the said arc being subjected to the action of a rotary magnetic field which is adapted to rotate it.

7. An apparatus for producing chemical reactions in a mass of gases, consisting in means for forming and causing an alternating electric arc to play in the said mass, and for subjecting the arc to the action of an alternating rotatory magnetic field within the said field.

8. An apparatus for producing chemical reactions in a mass of gases, consisting in means for forming and causing an alternating electric arc to play in the mass of gases and for subjecting the arc to the action of an alternating rotatory magnetic field of a different periodicity within the said rotary field.

In testimony whereof we affix our signatures in presence of two witnesses.

JOHAN JETMUND THORESEN.
FILIP THARALDSEN.

Witnesses:
  HENRY BORDEWICH,
  MICHAEL ALGER.